US012554219B2

(12) United States Patent
Yamauchi

(10) Patent No.: US 12,554,219 B2
(45) Date of Patent: Feb. 17, 2026

(54) IMAGE FORMING APPARATUS

(71) Applicant: KYOCERA Document Solutions Inc., Osaka (JP)

(72) Inventor: Hironori Yamauchi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 4 days.

(21) Appl. No.: 18/927,255

(22) Filed: Oct. 25, 2024

(65) Prior Publication Data

US 2025/0138458 A1 May 1, 2025

(30) Foreign Application Priority Data

Nov. 1, 2023 (JP) ................................ 2023-187527

(51) Int. Cl.
*G03G 15/20* (2006.01)

(52) U.S. Cl.
CPC ....... *G03G 15/205* (2013.01); *G03G 15/2064* (2013.01)

(58) Field of Classification Search
CPC ........... G03G 15/2017; G03G 15/2039; G03G 15/205
See application file for complete search history.

(56) References Cited

U.S. PATENT DOCUMENTS

2012/0141150 A1* 6/2012 Noh .................. G03G 15/2039 399/33
2012/0308252 A1* 12/2012 Shimura ........... G03G 15/2039 399/67

FOREIGN PATENT DOCUMENTS

JP H09-319251 12/1997
JP 2020187274 A * 11/2020

* cited by examiner

*Primary Examiner* — Thomas S Giampaolo, II

(57) ABSTRACT

An image forming apparatus includes a fuser heater, a semiconductor relay device between the fuser heater and a commercial power supply, a heater relay between the fuser heater and the commercial power supply, and a controller. The controller performs on/off control of the semiconductor relay device and the heater relay. The semiconductor relay device outputs an error signal if conducting current to the fuser heater is less than a threshold value in a period that the semiconductor relay device is controlled to be in a power conductive status. Further, the controller determines a line connection status between the controller and the semiconductor relay device correspondingly to whether the error signal is outputted from the semiconductor relay device or not in a period that the heater relay is controlled to be in a power cut-off status but the semiconductor: relay device is controlled to be in a power conductive status.

3 Claims, 3 Drawing Sheets

IMAGE FORMING APPARATUS

CROSS-REFERENCE TO RELATED APPLICATIONS

This application relates to and claims priority rights from Japanese Patent Application No. 2023-187527, filed on Nov. 1, 2023, the entire disclosures of which are hereby incorporated by reference herein.

BACKGROUND

1. Field of the Present Disclosure

The present disclosure relates to an image forming apparatus.

2. Description of the Related Art

An image forming apparatus includes a fuser device that fixes a toner image on a print sheet, and the fuser device includes a heater unit as a resistive heating element, a relay and a semiconductor switch connected in series to the heater unit, and a control unit that inputs a control signal to the relay and the semiconductor switch through a control line and thereby performs on/off control of the relay and the semiconductor switch. Further, this device measures a voltage at a position between the heater unit and a combination of the relay and the semiconductor switch in a power-on status, and thereby detects malfunction on the heater unit, the relay or the semiconductor switch.

However, in the aforementioned fuser device, if a control line between the semiconductor switch and the control unit is disconnected or the control line is unconnected, such malfunction is hardly detected before starting powering on the fuser heater.

SUMMARY

An image forming apparatus according to an aspect of the present disclosure includes a fuser heater, a semiconductor relay device between the fuser heater and a commercial power supply, a heater relay between the fuser heater and the commercial power supply, and a controller. The controller is configured to perform on/off control of the semiconductor relay device and on/off control of the heater relay. The semiconductor relay device outputs an error signal if conducting current to the fuser heater is less than a predetermined threshold value in a period that the semiconductor relay device is controlled to be in a power conductive status. Further, the controller performs determination of line a connection status between the controller and the semiconductor relay device correspondingly to whether the error outputted the signal is from semiconductor relay device or not in a period that the heater relay is controlled to be in a power cut-off status but the semiconductor relay device is controlled to be in a power conductive status.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
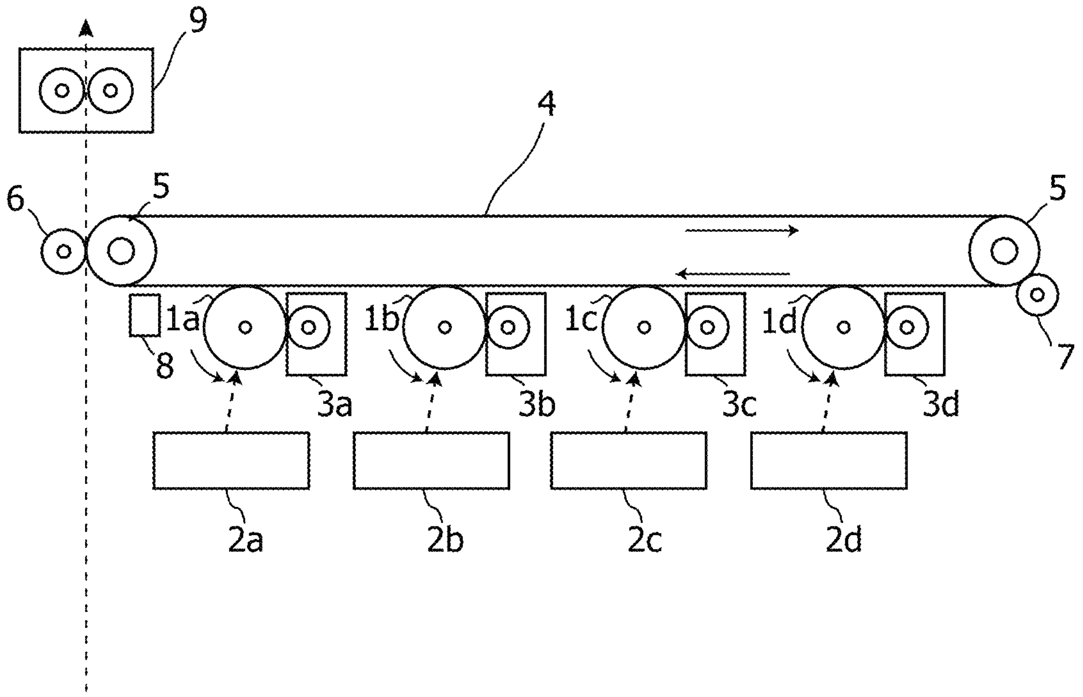
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus having an electrophotographic printing function, such as a printer, a facsimile machine, a copier or a multi function peripheral.

The image forming apparatus in this embodiment includes a tandem-type color development device. This color development device includes photoconductor drums 1*a* to 1*d*, exposure devices 2*a* to 2*d*, and development devices 3*a* to 3*d*. The photoconductor drums 1*a* to 1*d* are photoconductors of four toner colors: Cyan, Magenta, Yellow and Black.

The exposure devices 2*a* to 2*d* irradiate the photoconductor drums 1*a* to 1*d* with laser light and thereby form electrostatic latent images. Each of the exposure devices 2*a* to 2*d* includes a laser diode as a light source of the laser light, optical elements (such as lens, mirror and polygon mirror) that guide the laser light to the photoconductor drum 1*a*, 1*b*, 1*c*, or 1*d*.

Further, the periphery of each one of the photo conductor drums 1*a* to 1*d* includes a charging unit such as scorotron, a cleaning device, a static electricity eliminator and the like. The cleaning device removes residual toner on each one of the photo conductor drums 1*a* to 1*d* after primary transfer. The static electricity eliminator eliminates static electricity of each one of the photoconductor drums 1*a* to 1*d* after primary transfer.

Toner cartridges which contain toner of four colors: Cyan, Magenta, Yellow and Black are attached to the development devices 3*a* to 3*d*, respectively. In the development devices 3*a* to 3*d*, the toner is supplied from the toner cartridges, and this toner and carrier compose developer. The development devices 3*a* to 3*d* form toner images by attaching the toner to electrostatic latent images on the photoconductor drums 1*a* to 1*d*.

The photoconductor drum 1*a*, the exposure device 2*a* and the development device 3*a* perform development of Magenta. The photoconductor drum 1*b*, the exposure device 2*b* and the development device 3*b* perform development of Cyan. The photoconductor drum 1*c*, the exposure device 2*c* and the development device 3*c* perform development of Yellow. The photoconductor drum 1*d*, the exposure device 2*d* and the development device 3*d* perform development of Black.

The intermediate transfer belt 4 is a loop-shaped image carrier, and contacts the photoconductor drums 1*a* to 1*d*. Toner images on the photoconductor drums 1*a* to 1*d* are primarily transferred onto the intermediate transfer belt 4. The intermediate transfer belt 4 is hitched around driving rollers 5, and rotates by driving force of the driving rollers 5 towards the direction from the contact position with the photoconductor drum 1*d* to the contact position with the photoconductor drum 1*a*.

A transfer roller 6 causes an incoming paper sheet in transportation to contact the transfer belt 4, and secondarily transfers the toner image on the transfer belt 4 to a print sheet. The print sheet on which the toner image has been secondarily transferred is transported to the fuser device 9.

A roller 7 has a cleaning brush, and removes residual toner on the intermediate transfer belt 4 by contacting the cleaning brush to the intermediate transfer belt 4 after transferring the toner image to a print sheet.

A sensor 8 is an optical sensor used for toner density measurement, and irradiates the intermediate transfer belt 4 with a light beam and detects its reflection light. For example, in density adjustment, the sensor 8 irradiates a predetermined area on the intermediate transfer belt 4 with a light beam, detects its reflection light, and outputs an electrical signal corresponding to the detected intensity of the reflection light.

A fuser device 9 fixes a toner image transferred on a recording medium such as a print sheet in a heating-and-pressurizing manner.

Figure 2:
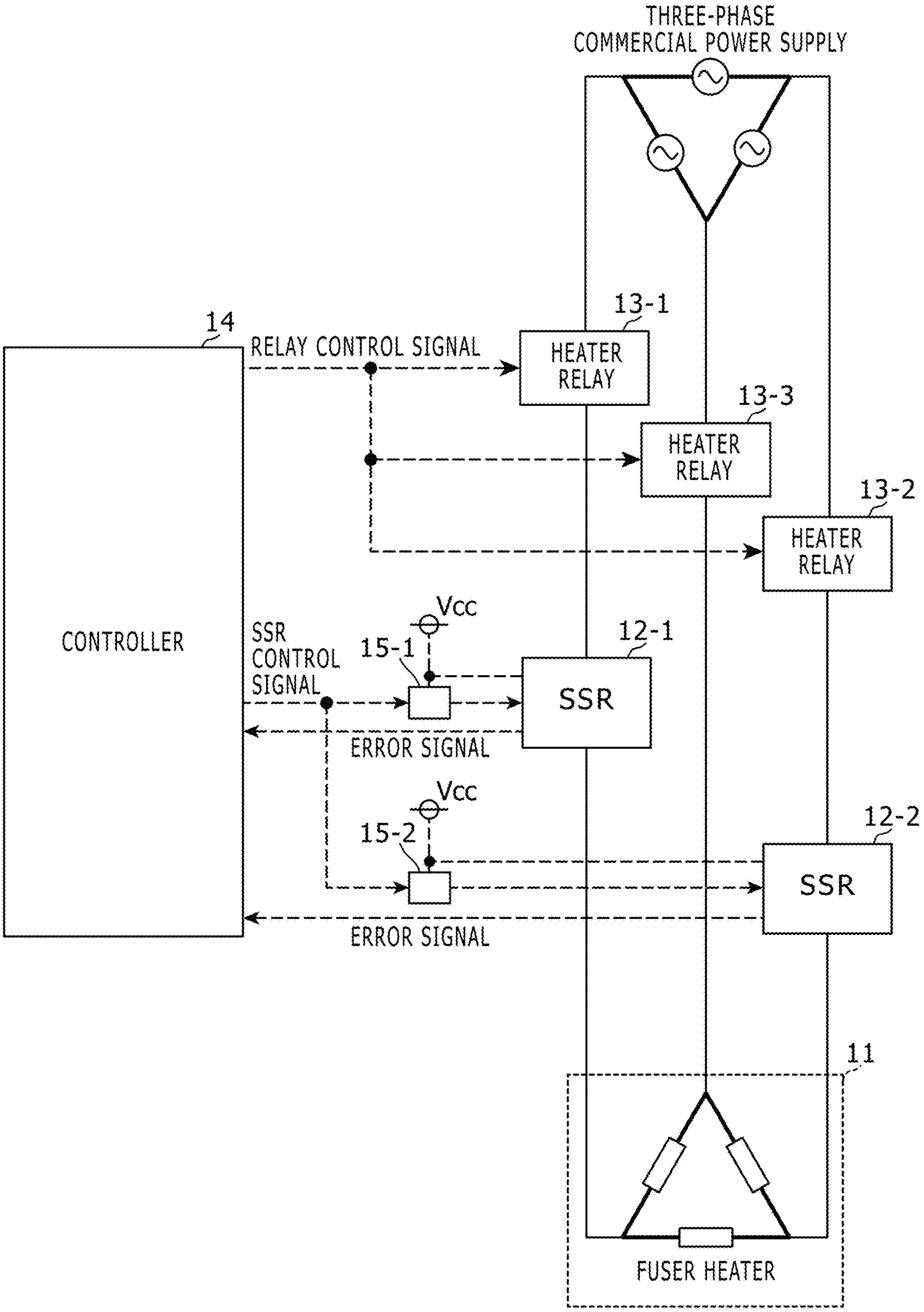
FIG. 2 shows a diagram that indicates an electronic configuration of the fuser device 9 shown in FIG. 1 and a control system thereof.

FIG. 2 shows a diagram that indicates an electronic configuration of the fuser device 9 shown in FIG. 1 and a control system thereof. As shown in FIG. 2, for example, the fuser device 9 includes a fuser heater 11 to which current of alternating current power is supplied on the basis of a commercial power supply. The fuser heater 11 is a heater including a resistance heating element, such as ceramic heater or planar heater. For example, the fuser heater 11 is arranged in an internal structural member that supports a fuser belt, a fuser film or the like, in a fuser roller or the like. Thus, the fuser heater 11 heats a specific part (a fuser belt, a fuser film or the like, in a fuser roller or the like) using resistance heating.

In this embodiment, as shown in FIG. 2, the commercial power supply is a three-phase commercial power supply, and the fuser heater 11 includes at least three resistance heating elements of delta connection or star connection.

Further, this image forming apparatus (the fuser device 9) includes semiconductor relay devices 12-1 and 12-2, and heater relays 13-1, 13-2 and 13-3, and a controller 14.

The semiconductor relay devices 12-1 and 12-2 are installed between the fuser heater 11 and the commercial power supply, and the heater relays 13-1, 13-2 and 13-3 are also installed between the fuser heater 11 and the commercial power supply. In a phase i (i=1, 2) that the semiconductor relay device **12-*i* is installed, the semiconductor relay device 12-*i* and the heater relay 13-*i* are electrically connected in series. The heater relays 13-1 to 13-3** are mechanical relays, for example.

Each semiconductor relay device **12-*i* is a solid state relay (SSR), and turns on/off a semiconductor switching element in accordance with a level of a SSR control signal and thereby moves to a power conductive status or a power cut-off status. Further, each semiconductor relay device 12-*i* includes a CT (Current Transformer) and watches a conducting current value of the fuser heater 11** using the CT.

Figure 3:
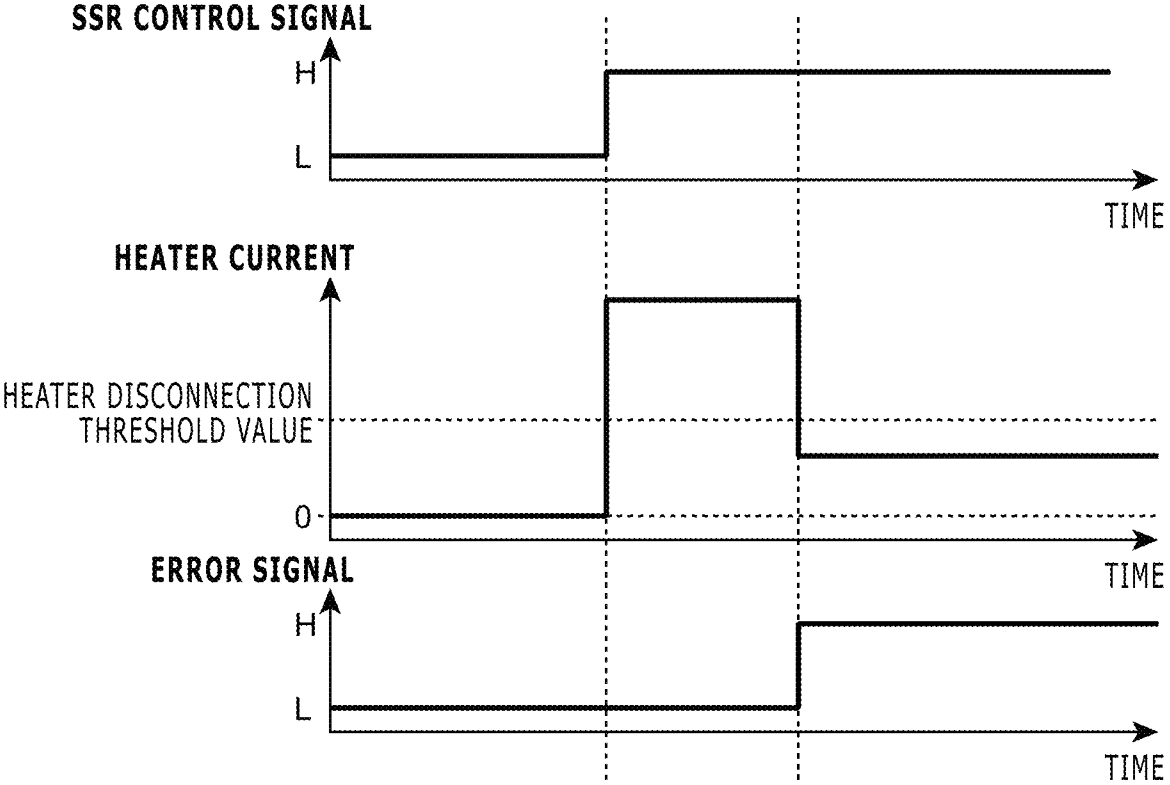
FIG. 3 shows a timing chart that explains a behavior of a semiconductor relay device 12-*i* shown in FIG. 2.

FIG. 3 shows a timing chart that explains a behavior of a semiconductor relay device **12-*i* shown in FIG. 2. As shown in FIG. 3, for example, each semiconductor relay device 12-*i* outputs an error signal if conducting current to the fuser heater 11 (i.e. conducting current in a phase i that the semiconductor relay device 12-*i* is installed) is less than a predetermined threshold value in a period that the semiconductor relay device 12-*i* is controlled to be in a power conductive status. In this embodiment, the semiconductor relay devices 12-*i*** are individually installed on at least two phases among three phases of the three-phase commercial power supply.

The controller 14 performs on/off control of the semiconductor relay devices 12-1 and 12-2 and on/off control of the heater relays 13-1 to 13-3.

Further, when the controller 14 performs temperature control of the fuser heater 11, the controller 14 performs on/off control of the semiconductor relay device **12-*i* while controlling the heater relays 13-1 to 13-3** to be in a power conductive status (i.e. ON status).

Further, the image forming apparatus (the fuser device 9) includes switching elements 15-1 and 15-2 such as Field Effect Transistor (FET) to input an SSR control signal to the semiconductor relay devices 12-1 and 12-2.

The switching element **15-*i* is connected to a power supply Vcc (here, 24 volt power supply) of the semiconductor relay device 12-*i* and pulls up (an H level of) of the SSR control signal to a power supply voltage of the power supply Vcc (here, 24 volt) and inputs the SSR control signal to the semiconductor relay device 12-*i***.

Further, the controller 14 performs a line connection test of the semiconductor relay devices 12-1 and 12-2. Regarding each of the semiconductor relay devices 12-1 and 12-2, in the line connection test, the controller 14 controls the semiconductor relay devices 12-1 and 12-2 to be in a power conductive status (i.e. ON status) in a status that the controller 14 controls the heater relays 13-1 to 13-3 to be a power cut-off status (i.e. OFF status), and performs determination of a line connection status between the controller 14 and each semiconductor relay device **12-*i* correspondingly to whether the controller 14 detects an error signal outputted from each semiconductor relay device 12-*i* or not in a period that the controller 14 controls the semiconductor relay devices 12-1 and 12-2 and the heater relays 13-1 to 13-3** as mentioned.

Specifically, it is determined whether or not connection is proper through a control line between the controller 14 and the switching element **15-*i* for the SSR control signal, a control line between the switching element 15-*i* to the semiconductor relay device 12-*i* for the SSR control signal, a power-supply line of the switching element 15-*i* and the semiconductor relay device 12-*i*, a control line between the controller 14 and the semiconductor relay device 12-*i*** for the aforementioned error signal, and the like. For example, if the error signal (of an H level) is not detected, then it is determined that malfunction on a line connection occurs (such as disconnection of these control lines or the power-supply line or unconnection of terminals of these control lines or the power-supply line).

Furthermore, the controller 14 performs the aforementioned line connection test before starting powering on the fuser heater 11.

The following part explains control of the fuser device 9 in the image forming apparatus shown in FIG. 1.

Before starting powering on the fuser heater 11, regarding each of the semiconductor relay devices 12-1 and 12-2, in the line connection test, the controller 14 controls the semiconductor relay devices 12-1 and 12-2 to be in a power conductive status (i.e. ON status) in a status that the controller 14 controls the heater relays 13-1 to 13-3 to be a power cut-off status (i.e. OFF status), and performs determination of a line connection status between the controller 14 and each semiconductor relay device **12-*i* correspondingly to whether the controller 14 detects an error signal outputted from each semiconductor relay device 12-*i* or not in a period that t the controller 14 controls the semiconductor relay devices 12-1 and 12-2 and the heater relays 13-1 to 13-3** as mentioned.

Subsequently, if the controller 14 determines that malfunction appears on the aforementioned line connection status, then the controller 14 does not start powering on the fuser heater 11 and informs a user of this malfunction by displaying a message or the like.

Contrarily, if the controller 14 determines that malfunction does not appear on the aforementioned line connection status, then the controller 14 controls the heater relays 13-1 to 13-3 to be in a power conductive status (ON status), and thereafter, performs on/off control of the semiconductor relay devices 12-1 and 12-2 and starts powering on the fuser heater 11 and thereby performs temperature control of the fuser heater 11.

As mentioned, in the aforementioned embodiment, the semiconductor relay devices 12-1 and 12-2 are installed between the fuser heater 11 and the commercial power supply, and the heater relays 13-1 to 13-3 are installed between the fuser heater 11 and the commercial power supply. The semiconductor relay device 12-1 or 12-2 outputs an error signal if conducting current to the fuser heater 11 is less than a predetermined threshold value in a period that the semiconductor relay device 12-1 or 12-2 is controlled to be in a power conductive status. Further, the controller 14 performs determination of a line connection status between the controller 14 and the semiconductor relay device 12-1 or 12-2 correspondingly to whether the error signal is outputted from the semiconductor relay device 12-1 or 12-2 or not in a period that the heater relays 13-1 to 13-3 are controlled to be in a power cut-off status but the semiconductor relay device 12-1 and 12-2 are controlled to be in a power conductive status.

Consequently, before starting powering on the fuser heater 11, malfunction can be detected on line connection in the control system.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the fuser heater 11 corresponding to a three-phase commercial power supply and a three-phase power supply is used. Alternatively, the fuser heater 11 corresponding to a single-phase commercial power supply and a single-phase power supply may be used.

What is claimed is:

1. An image forming apparatus, comprising:

a fuser heater;

a semiconductor relay device between the fuser heater and a commercial power supply;

a heater relay between the fuser heater and the commercial power supply; and a controller configured to perform on/off control of the semiconductor relay device and on/off control of the heater relay;

wherein the semiconductor relay device outputs an error signal if conducting current to the fuser heater is less than a predetermined threshold value in a period that the semiconductor relay device is controlled to be in a power conductive status; and the controller performs determination of a line connection status between the controller and the semiconductor relay device corresponding to whether the error signal is output from the semiconductor relay device or not in a period that the heater relay is controlled to be in a power cut-off status but the semiconductor relay device is controlled to be in a power conductive status.

2. The image forming apparatus according to claim 1, wherein the commercial power supply is a three-phase commercial power supply;

the semiconductor relay device is semiconductor relay devices individually installed on at least two phases among three phases of the three-phase commercial power supply; and regarding each of the semiconductor relay devices, the controller performs determination of a line connection status between the controller and the semiconductor relay device corresponding to whether the controller detects the error signal output from the semiconductor relay device or not in a period that the heater relay is controlled to be in a power cut-off status but the semiconductor relay device is controlled to be in a power conductive status.

3. The image forming apparatus according to claim 1, wherein before starting powering on the fuser heater, the controller performs determination of a line connection status between the controller and the semiconductor relay device corresponding to whether the error signal is output from the semiconductor relay device or not in a period that the heater relay is controlled to be in a power cut-off status but the semiconductor relay device is controlled to be in a power conductive status.

* * * * *